United States Patent [19]

Shwayder

[11] 3,976,434

[45] Aug. 24, 1976

[54] SAW AND IMPACT RESISTANT MEMBER

[76] Inventor: Warren M. Shwayder, 2335 E. Lincoln, Birmingham, Mich. 48007

[22] Filed: July 26, 1974

[21] Appl. No.: 492,191

[52] U.S. Cl. .................................. 29/191.2; 70/53; 70/417; 164/97

[51] Int. Cl.[2] .......................................... B32B 15/16

[58] Field of Search ............ 29/191.2, 195 A, 187.5, 29/191.6, 517, 420.5, 182.3, 473.9, 474.1, 530; 70/53, 417; 164/97, 98, 108

[56] References Cited

UNITED STATES PATENTS

| | | | |
|---|---|---|---|
| 1,630,631 | 5/1927 | Pauly | 29/191.6 X |
| 3,505,039 | 4/1970 | Roberts et al. | 29/191.6 |
| 3,552,938 | 1/1971 | Draca | 29/191.6 |
| 3,777,517 | 12/1973 | Shwayder et al. | 70/53 |

*Primary Examiner*—L. Dewayne Rutledge
*Assistant Examiner*—E. L. Weise
*Attorney, Agent, or Firm*—Cullen, Settle, Sloman & Cantor

[57] ABSTRACT

A saw and impact resistant member formed of an elongated metal core having a longitudinal exterior surface and a thin wall metal sheath surrounding said core and in contact with said core surface at a finite number of contact lines with longitudinal spaces being formed between the interior wall of said sheath and the exterior surface of the core. The spaces are filled with a matrix formed of hard carbide particles and a soft binder material. The sheath is closely fitted on the core to exclude both binder and hard particles therebetween except in said longitudinal spaces.

2 Claims, 10 Drawing Figures

FIG. 1
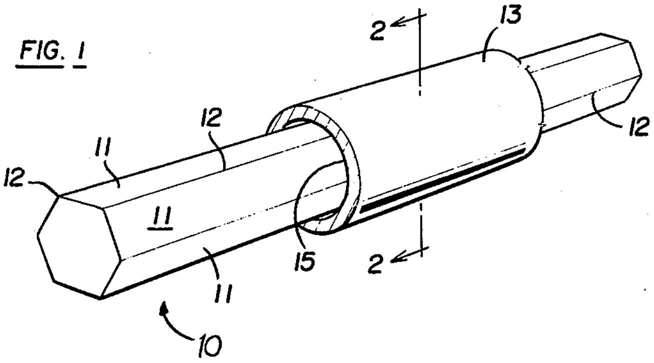
FIG. 2
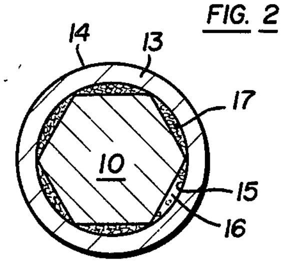
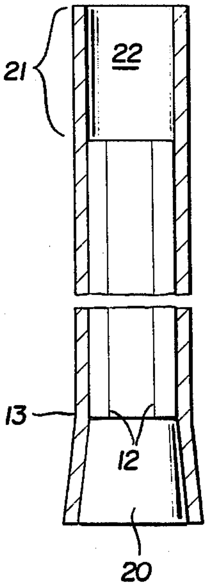
FIG. 3
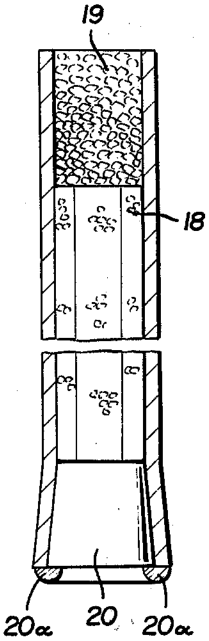
FIG. 4
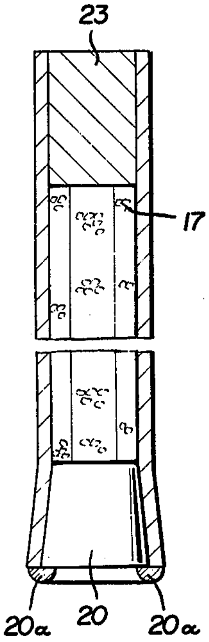
FIG. 5
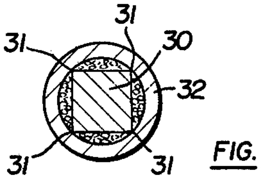
FIG. 8
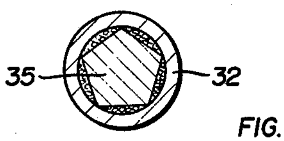
FIG. 9
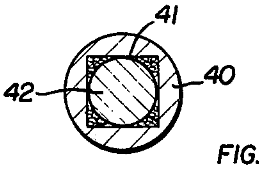
FIG. 10
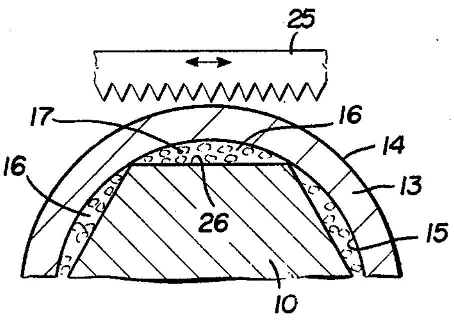
FIG. 6
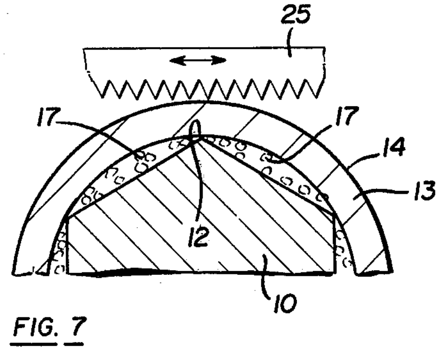
FIG. 7

SAW AND IMPACT RESISTANT MEMBER

BACKGROUND OF THE INVENTION

Saw and impact resistant members are utilized as security bars on windows, in jails and the like, and are also bent into the U shape of a shackle for use as part of a padlock.

Conventionally, these bars are made of steel rods which are heat treated for hardness. Heat treated steel rods have only a limited resistance to saw cutting and virtually no resistance to cutting with carbide coated saws. In addition, they may be relatively easily broken by the impact of a heavy hammer.

In U.S. Pat. No. 3,777,517, of which I am a joint inventor and the sole owner, there is disclosed a padlock shackle formed of the elongated metal core within a thin walled tube with the core having longitudinally extending shallow grooves and with the grooves filled with a matrix formed of hard carbide particles and a soft material binder. This provides greater resistance to sawing because the carbide particles cause the saw teeth to break.

Similarly, the U.S. Pat. No. 3,552,938 to Draca discloses a security bar having a grooved core completely surrounded by a soft binder material with carbide particles only in the grooves.

The invention herein relates to an improved saw and impact resistant security member which eliminates the grooved core, thereby giving substantial but not complete circumferential coverage of the core with carbide particles, without any loss in the resistance to cutting by a saw.

SUMMARY OF INVENTION

The improved saw and impact resistant member of the present invention comprises an elongated metal core having a longitudinal exterior surface and a thin walled metal sleeve or sheath surrounding the core and in contact with the core surface at a finite number of contact lines. A plurality of longitudinal spaces are defined between the interior surface of the sleeve and the longitudinal exterior of the core and these spaces are filled with a matrix of hard particles such as tungsten carbide $B_4C$, $Al_2O_3$, mixtures thereof, or the like in a soft metal binder or braze.

Both the core and the sleeve are made of a work hardenable heat treated steel which need not be of the same alloy. As part of the working of the metal, if the saw and impact resistant member is being used as a lock shackle, the member is formed into a generally U-shape.

The various objects and advantages of this invention will become apparent upon reading the following description, taken in conjunction with the drawings.

BRIEF DESCRIPTION OF THE DRAWINGS

In the drawings, wherein like reference numerals identify corresponding elements:

FIG. 1 is a perspective illustration, partly broken away, of one form of the core and the sheath of the present invention;

FIG. 2 is an enlarged cross-sectional view of the invention of FIG. 1 as seen in the plane of the arrows 2—2 of FIG. 1;

FIG. 3 shows the initial assembly of the sheath upon the core;

FIG. 4 shows the step of applying the binder material and hard particles into the spaces between the sheath and the core;

FIG. 5 is a partially cross-section view of the assembled security bar;

FIG. 6 is an enlarged partial cross-sectional view of the security member showing the resistance to a saw blade;

FIG. 7 is another enlarged partial cross-sectional view showing the resistance to a saw blade; and FIGS. 8–10 are cross-sectional illustrations of alternate configurations of the present invention.

DETAILED DESCRIPTION OF THE INVENTION

FIG. 1 illustrates, in perspective, a saw-and-impact resistant security bar including, in a first embodiment, an elongated metal core 10 having a polygonal cross-section. The core has an exterior surface 11 including a plurality of longitudinal faces with each pair of adjacent faces meeting to form a longitudinal corner or edge 12.

The core 10 is surrounded by a longitudinal tubular sheath or sleeve 13 closely fitted onto the core. The sleeve has an exterior surface 14 and an interior surface 15, and the interior surface of the sleeve is in contact with the exterior surface of the core at a finite number of contact lines. In the embodiment of FIG. 1, each of these finite contacts correspond to an edge 12 of the core contacting the sleeve.

When the sheath is force-fitted or closely fitted onto the core, there are defined a plurality of longitudinal spaces 16 therebetween. Each space 16 is bounded by the interior wall 15 of the sheath, the surface 11 of the core and two adjacent finite contacts therebetween. Thus, for the embodiment of FIG. 1, as seen in cross-section in FIG. 2, each space 16 takes the mathematical shape of a segment. A segment is a portion of the area of a circle bounded by a cord and by an arc of the circle.

The segments 16 are each filled with a matrix 17 formed of hard particles 18 and a binder 19. The particles are preferably of a hard metal particles such as tungsten carbide or the like. The binder may be a soft metal such as copper braze. The particles are closely packed within the spaces 16 and the areas around the particles are filled with the binder to form a solid matrix.

With respect to FIGS. 3, 4 and 5, the method of assembling the security member of the present invention will now be explained. First the core 10 of polygonal cross-section is formed. Next, the thin walled tubular sheath 13 is force fitted onto the core with the edges 12 of the core in contact with the inner face 15 of the sheath. As illustrated in FIGS. 3, 4, and 5, the lower end 20 of the core may be flared outwardly if desired and if so, the sleeve or sheath 13 is suitably force fitted onto the flared portion of the core. The lower end 20 may be welded as at **20*a* to the lower core end. Also as shown in FIGS. 3, 4 and 5, a portion 21 of the sheath 13 extends axially above the end of the core 10.**

Once the sheath is forced onto the core, as illustrated in FIG. 3, then the hard carbide particles 18 are poured into the segments or spaces 16 with the security member arranged upright as illustrated generally in FIGS. 3, 4 and 5. This forms a packing of carbide particles within the segments or spaces.

The axial space 22 above the core but interior of the sheath may be filled with pellets or beads or the like of a brazing compound such as the copper brazing pellets 19 and, with the security bar in the upright position, the bar is heated to melt the braze or binder which flows downwardly filling any spaces between the carbide particles within the segments 16. Preferably, sufficient braze is placed into the tube so that the upper end of the tube 22 is filled with braze to form a solid plug 23 as shown in FIG. 5.

Next, the security member is swaged to reduce its diameter to the required size while simultaneously elongating it and work hardening the metal of both the core and the sheath. Preferably the sheath is formed of a stainless steel to provide greater toughness and corrosion resistance.

After swaging, the rod may be bent into the U-shaped shackle formation as illustrated in my aforementioned patent. The particular materials which may be utilized are set forth in my U.S. Pat. No. 3,777,517 which is hereby incorporated by reference.

With reference to FIGS. 6 and 7 several benefits of the present invention are illustrated. In FIG. 6 there is shown a saw blade 25 which might be utilized in an attempt to cut through the security bar of the present invention. The saw blade is shown substantially parallel to one face 26 of the core. As the blade cuts through the sheath 13 the entire blade comes in contact with the hard matrix 17. This will cause a breaking of the teeth of the saw and prevent penetration of the core. The core serves to hold the matrix 17 in place against the pressure of the saw. This is quite important, for if the matrix was not held in place, it would be possible to first saw through the sheath and cause some of the matrix 17 to move, and then insert a chisel and punch through the core.

With respect to FIG. 7, another position of a saw blade 25 relative to the security bar is shown. The saw blade is directed in such a fashion that the first contact with the core will be at a corner or edge 12. However, this does not adversely effect the resistance of the member to the saw because there is sufficient matrix material in the two spaces just adjacent the edge 12 of the core to sufficiently damage the saw blade. Thus, no substantial penetration of the core is possible.

EMBODIMENTS OF FIGS. 8, 9, & 10

The principles of the present invention require a finite number of lines of contact between the core and the sleeve or sheath. Thus, in the embodiment of FIGS. 1 and 2, each of the six edges 12 of the core 10 provides an elongated line of contact with the sleeve. The core of FIGS. 1–7 is hexagonal in cross-section.

FIG. 8 illustrates a square core 30 having its four corners 31 each in contact with the sleeve 32. The matrix of binder and carbide thus fills four spaces between the core and the sleeve.

Similarly, FIG. 9 shows a pentagonal core 35 with five contact lines or locations between the core and the sleeve, and five spaces filled with the matrix.

Finally, FIG. 10 illustrates a sleeve 40 having a square bore 41 and a round core 42 in the bore. Again, there are four contact locations between the core and the sleeve.

In most environments, the security member of the present invention provides significant advantages over the prior inventions. For example, in the prior inventions it was necessary to either have a splined core, necessitating the cutting of grooves in the core, or grooves in the sleeve, necessitating working the sleeve, to provide spaces for the matrix. In the present invention, the inventive concept of finite lines of contact between the core and the sleeve serves to define the spaces for the matrix between the outer surface of the core and the interior of the sheath. Furthermore, there is an improved resistance to the saw blade by utilizing the present construction because of the substantial (but not complete) circumferential presence of carbide. The contact lines form reinforcing points to prevent bending of the completed bar. It should be appreciated that various modifications may be made without departing from the spirit and scope of the present invention. Therefore, having fully described the present invention, the invention should be limited only by the scope of the following claims.

What is claimed is:

1. A saw and impact resistant member comprising:

an elongated metal core having a plurality of generally flat longitudinal faces, the adjacent faces meeting at relatively sharp longitudinal edges to thereby define a core of polygonal cross-section;

a thin walled tubular metal sheath telescopically surrounding said core and being in contact with the core only at said relatively sharp core edges to center the core relative to the sheath;

a plurality of substantially identical longitudinal spaces each having a segment-shaped cross-section, each formed between the interior wall surface of said tubular sheath and one longitudinal face of said core;

said longitudinal spaces being filled with a matrix formed of closely packed hard particles such as metallic carbide or the like and a soft binder material;

said tubular sheath being closely fitted on said polygonal core to exclude both said binder and said hard particles therebetween except in said longitudinal spaces.

2. An improved saw and impact resistant member comprising:

an elongated cylindrical metal core;

a thin walled elongated metal sleeve having an interior bore of a polygonal configuration to define an interior surface including a plurality of faces of generally equal width;

said sleeve telescopically surrounding said core with each of the interior surface faces of the sleeve contacting the exterior surface of the cylindrical core at a finite number of elongated lines of contact; and a plurality of longitudinal spaces each being bounded by two adjacent elongated lines of contact and the exterior core surface and the interior sleeve surface therebetween;

said longitudinal spaces being filled with a matrix formed of closely packed hard particles such as metallic carbide and a soft binder material;

said sleeve and core being closely fitted together to provide said lines of contact and to exclude said matrix therebetween except in said longitudinal spaces.

* * * * *